Dec. 7, 1937.  H. MUTH ET AL  2,101,153
ELECTRICAL CONDENSER
Filed March 28, 1934

INVENTORS
HERBERT MUTH
WILHELM RUNGE
BY
ATTORNEY

Patented Dec. 7, 1937

2,101,153

UNITED STATES PATENT OFFICE 2,101,153

ELECTRICAL CONDENSER

Herbert Muth and Wilhelm Runge, Berlin, Germany, assignors to Telefunken Gesellschaft für Drahtlose Telegraphie m. b. H., Berlin, Germany, a corporation of Germany Application March 28, 1934, Serial No. 717,789
In Germany April 21, 1933

7 Claims. (Cl. 175—41)

This invention relates to condensers which are simple in construction and independent of temperature changes, particularly when employed for oscillatory circuits for short waves.

An object of this invention is to provide a condenser whereby the electrical plates are not subjected to any mechanical distortion due to tension when the condenser is influenced by heat.

Still another object of this invention is to provide a condenser whose insulating support is shielded to the electrostatic forces set up within the condenser unit to reduce to a minimum the dielectric flux losses.

It is well known in the prior art that it is desirable to use condensers in oscillatory circuits, which are maintained independent of the temperature by employing suitable means to maintain the oscillatory circuits constant irrespective of temperature changes.

The invention is derived from the fact that materials having in a particular measure the property to be independent of the temperature, are preferably insulators (ceramic bodies and the like). Such bodies can easily be worked, can be produced at low cost, and in this respect, they differ in an advantageous way, from the metals of constant temperature, in particular from the metals independent in regard to temperature and known under the name of "Invar".

In accordance with this invention, the condensers comprise a number of fixed plate elements assembled in such a manner that the plates are held together along a straight line passing approximately through the center of gravity of the plates. The condenser plates are produced bp using materials which are unaffected by the temperature and serve as supporting members for the layers or condenser plates. Specific materials that are particularly suited for this purpose are those whose thermal expansion coefficient is less than $1,5.10^{-6}$ per degree. The metallic layers applied to the ceramic body, forming support therefor, are suitably in the form of thin metal skins. It has been found that the thermal expansion of the ceramic substances is sufficiently small for such purposes. At temperature variations, however, the dielectric constants of the ceramic materials are subject to change. Consequently this would likewise cause a capacitive change at varying temperatures.

Hence, a further feature of the invention resides in so constructing the condenser that the ceramic bodies act only as a support for the metallic plate but not as the dielectric. It is especially necessary to carry out the conductor structure in such manner that the unshielded dielectric flux through the ceramic material is less than 20% of the entire dielectric flux. Plate condensers formed of ceramic bodies with a metallized surface and corresponding spacers, are preferably provided with spacers of such material whose expansion coefficient is chosen twice as high as the expansion coefficient of the ceramic plates. At temperature variations, the small increase with the temperature of the surface of the plate is then compensated by a corresponding distance increase. The use of special spacers compensating for the temperature change, plays an essential role, if the temperature coefficient of the ceramic material is greater than $1,5.10^{-6}$ per degree, thus approximately of the order between $1,5.10^{-6}$–$10^{-5}$ per degree. Metals may also be used as spacers if the latter are placed against the insulating ceramic bodies. The use of metal spacers affords an advantage insofar as it is a simple means to tap screw threads and the like, into the metal thereby increasing the mechanical strength of the condenser arrangement.

This invention will be more completely understood by referring to the accompanying drawing, in which Fig. 1 is a sectional view of one embodiment of this invention;

Figure 1:
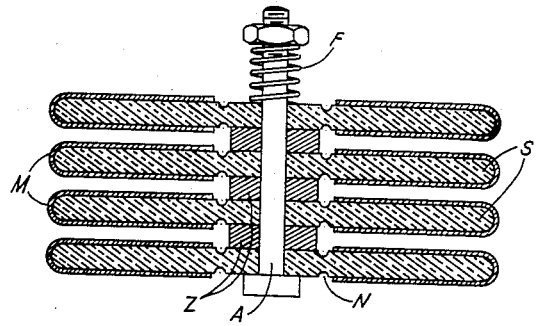

The embodiment illustrated by Fig. 1 of the drawing represents a plate condenser in accordance with the invention, whereby such features have been considered. The plates are formed of disks S of ceramic material which are coated on the surface with a thin layer of metal which may be applied by any well-known process, such as electroplating, sandblasting, etc. The metal is arranged to practically surround the ceramic body entirely. Hence the ceramic material is located to the greater part within the interior of a space free of electrostatic forces in the manner of a Faraday cage inasmuch as it is entirely surrounded by the metallic layer. The active area or part of the dielectric being substantially enclosed by the metallic covering, thus not influenced by the capacity of the condenser. The spacing of the various metallic plates is carried out by means of spacers Z. The latter may be composed of a suitable metal, because of the fact that the places on the plate at which the metallic spacers are to touch the ceramic bodies are free of the metallized surface M forming the conducting layer. In the various embodiments shown by the drawing, the plate is kept free from touching or approaching the metallic layer at its center. At the center of the disk where the metallized surface terminates, a groove N is machined thereinto, in (or at) which the metallized layer M terminates. This groove acts so that only a small number of stray lines enter at the ceramic material. By means of a shaft or bolt A and by the action of a suitable spring F the metallic plates forming the condenser, are held together. The input connections are provided at the front edges of the plates by means of soldered wires or the like.

Figure 2:
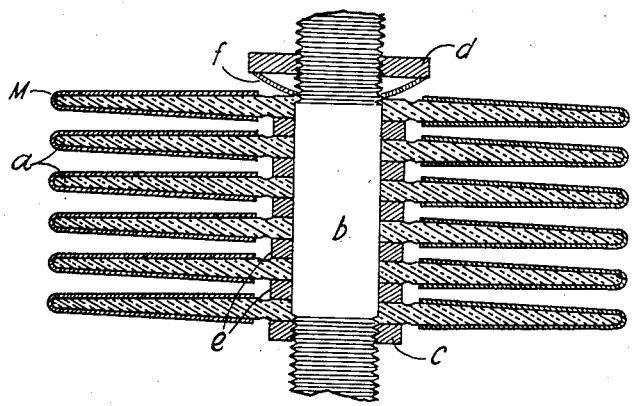
Fig. 2 is a sectional view of another embodiment of this invention.
Figure 3:
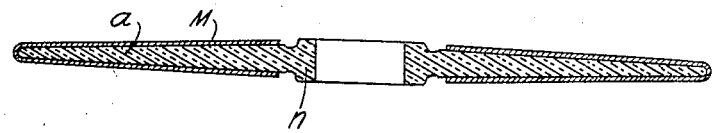
Fig. 3 is a cross-sectional detail of one of the electrode plates shown in the embodiment of Fig. 2.

Another embodiment of this invention is shown by Fig. 2 of the drawing, wherein $a$ designates the electrode plates which may preferably be of round shape or any other shape, for instance, square, polygonal, etc. The plates may consist of a metallized dielectric covering over a ceramic body. The dielectric is preferably a substance having sufficient strength and a small coefficient of heat expansion. Referring now in detail to Fig. 2, $b$ is a metallic shaft or may be made of ceramic material, serving as support for the plates and also for the central alignment thereof and having on its threaded portion, nuts $c$, $d$, for holding the plates together. A spring $f$ is provided whereby the plates are under spring pressure. $e$ designates spacers between the plates; they may be formed of metal if the condenser plates consist of metallized insulating plates. In this case it is obvious that the metal coating or skin of the plates must not extend so as to closely approach the spacers. The spacer may also consist of insulating material in each of the embodiments. Furthermore, if the plates of the modification which consist of a metallized layer and insulating or dielectric coating on a ceramic body, the spacers may then be formed as hubs $n$ at the central portion of the plates, as shown in Figure 3, representing a cross section of such a plate. It is advisable, to limit the bearing surfaces of the plates and spacers respectively to possibly small portions possibly close and symmetrical to the point of gravitation, as far as this is compatible with a sufficient mechanical strength of the condenser.

If all these layers are to be electrically connected in series, it is sufficient to connect the current input leads to the uppermost and lowest plate. Where the plates are electrically connected in parallel, current leads must be arranged across contacts, preferably at the edges of the plates.

The mode of execution shows a condenser by way of example which has an air or gaseous dielectric and for which the invention is of particular value, although it is also applicable to be immersed in any suitable vessel containing a fluid such as a high-grade insulating oil so as to act as liquid condensers.

Having fully described our invention, what we claim is:

1. Condenser independent of temperature, comprising a plurality of plates of ceramic materials which serve as supports of a metallic conducting layer for said condenser, said plates being separated by a plurality of metal spacers, characterized in that said plates have central places of contact maintained free of the layer where said metal spacers are located, said places of contact being surrounded by an annular groove in which the conducting layer terminates.

2. An electric plate condenser comprising a plurality of plates of ceramic materials, a metallic surface covering a portion of said plates the central portion of said plates being arranged to form central bearing surface for a plurality of separate spacers for spacing said plates from each other, said plates having a central aperture, a rod passing through said aperture to bind said plates and separate spacers together in a unit.

3. An electrical condenser which is substantially independent of temperature changes comprising a plurality of disc-like plates of ceramic material having a metallized surface for said condenser, a plurality of spacing members for said plates, said central portions of said plates being free of said metallized surfaces at which point said spacing members are located, a central aperture in said disc-like plates, central means passing through said aperture for binding said plates and spacing members together in mechanical and electrical relationship.

4. An electrical condenser according to claim 3 characterized in that the metallic portions of the plates are so proportioned by coating said disc close to the center that the dielectric flux of the ceramic material is less than twenty percent of the entire dielectric flux of the condenser.

5. An electrical condenser according to claim 3 characterized in that spacing members of said plates have a coefficient of expansion which is twice as high as that of the ceramic material.

6. An electrical condenser which is substantially independent of temperature changes comprising a plurality of disc-like plates of ceramic material having a cross-section which tapers from the central portion thereof outward toward the periphery, a metallized surface covering the tapered portion of said plates, a plurality of spacers for said plates, said plates having the central portion arranged to form a bearing surface for said spacers, a central aperture in said plates, a threaded rod-like member passing through said aperture to bind said plates and spacing members together in mechanical and electrical relationship.

7. An electrical condenser which is substantially independent of temperature changes comprising a plurality of disc-like plates of ceramic material having a metallized surface for said condenser, a plurality of spacing members for said plates, the central portions of said plates being free of said metallized surfaces at which points said spacing members are located, a central aperture in said plates, a center rod passing through said aperture, at least one end of said rod being threaded, and spring tension means cooperating with said central rod for binding said plates and said spacers in mechanical and electrical relationship.

HERBERT MUTH.
WILHELM RUNGE.